Nov. 2, 1954 R. L. SEIDMAN 2,693,234
CUTTING APPARATUS FOR SEVERING STRIPS
FROM CONTINUOUS MATERIAL

Filed July 1, 1950 5 Sheets-Sheet 3

INVENTOR
RICHARD L. SEIDMAN
BY
ATTORNEY

Nov. 2, 1954
R. L. SEIDMAN
2,693,234
CUTTING APPARATUS FOR SEVERING STRIPS
FROM CONTINUOUS MATERIAL
Filed July 1, 1950
5 Sheets-Sheet 4
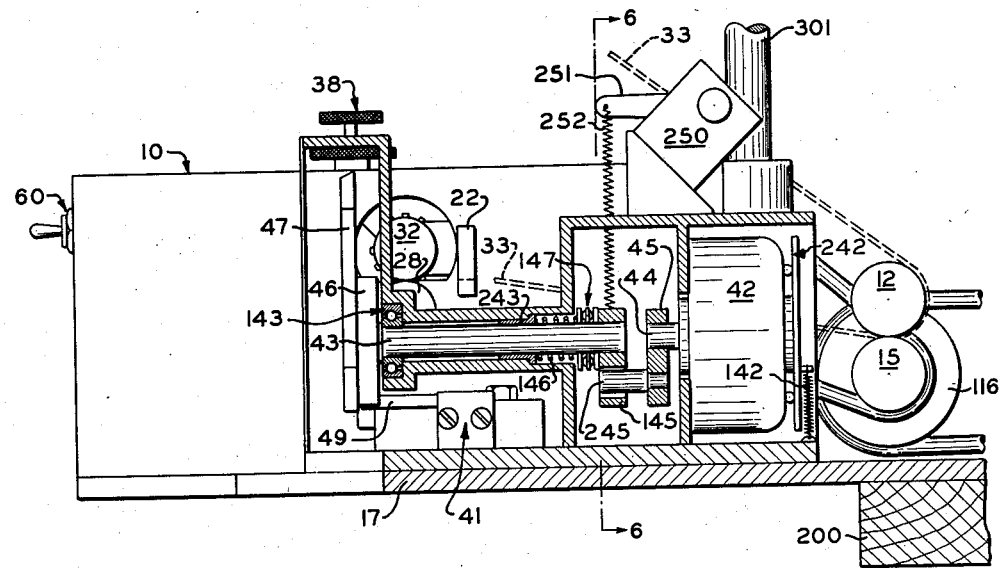
FIG. 5
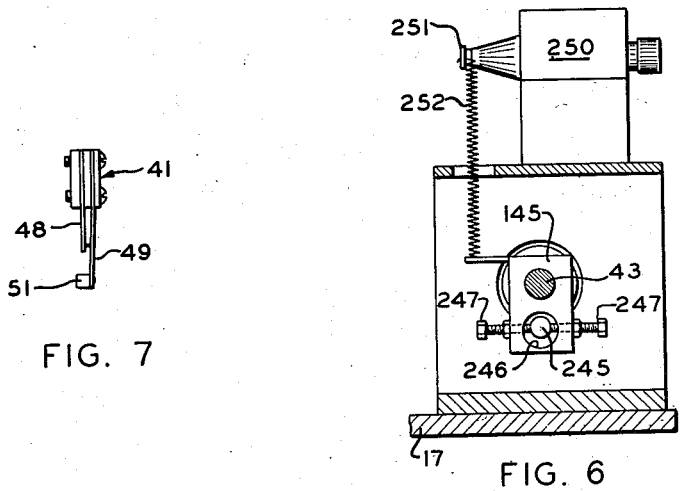
FIG. 7
FIG. 6
INVENTOR
RICHARD L. SEIDMAN
BY
ATTORNEY

United States Patent Office 2,693,234
Patented Nov. 2, 1954

2,693,234

CUTTING APPARATUS FOR SEVERING STRIPS FROM CONTINUOUS MATERIAL

Richard L. Seidman, Norwalk, Conn.

Application July 1, 1950, Serial No. 171,605

11 Claims. (Cl. 164—43)

My invention relates to cutting apparatus and more particularly has reference to apparatus for cutting strips from continuous material, especially material in the form of continuous webbing, ribbon or the like.

This application is in part a continuation of my co-pending application Serial No. 102,746, filed July 2, 1949, for Device for Cutting a Web Operated Responsive to Thickened Portions of the Web.

Objects of the invention are to provide cutting apparatus having feed means to advance the material to be cut to cutter means driven by electrically operated means and controlled to effect cutting in accordance with a dimension of the strips of the material to be cut; to provide means for effecting cutting of the materials into strips of a predetermined length, or in accordance with variations in the thickness of the material undergoing cutting; and to provide mechanical and electrical detector-actuator means for operating a rotary solenoid to drive a rotatable knife member whereby to effect cutting of material advanced by said feed means.

Other objects of the invention are to provide an electric circuit arrangement permitting high speed operation of a rotary solenoid driven cutter means; more specifically, to provide a circuit arrangement for use with cutting means driven by a rotary solenoid wherein a relay is employed to set up a circuit with said solenoid, to hold said circuit in set up condition and to trigger said circuit to actuate the solenoid by means which either measure the strip length to be cut from continuous material being advanced to the cutting means or by means with detect variations in thickness in the material undergoing advancement; to provide means actuated through said solenoid to open all sub-circuits of said circuit arrangement when the solenoid has reached the end of its stroke whereby to permit the circuit arrangement, including said solenoid, to be restored to a condition ready to carry out another cutting cycle.

Further objects of the invention reside in the provision of cutting apparatus of the character described adapted for use in conjunction with an existing machine wherein material, which is ready to be severed into strips and which is being discharged by the machine, is engaged by the cutting apparatus and its advance is continued without interruption to the feed means of said apparatus, as well as to the provision of cutting apparatus of the character described which is capable of operation upon continuous material drawn from a stationary supply.

Still further objects of the invention are to provide a detector-actuator mechanism for causing cutting apparatus to cut continuous material into predetermined lengths, as well as detector-actuator mechanism for causing the cutting apparatus to cut material according to its thickness; to provide means in cutting apparatus for adjusting the knife members thereof longitudinally of the flow path of material being fed to said knife members and also means for angularly adjusting said knife members to the path of flow of said material; to provide a special drive or coupling connection between a rotatable knife blade and the mechanism for actuating it; and generally to provide apparatus for cutting continuous material into strips which is characterized by its high speed cutting rate and a positiveness and rapidity of action which substantially eliminates pile-up of material continuously advanced to the cutter means of the apparatus by a design and construction which, in carrying out a cutting cycle, permits the flow path of the material to be quickly cleared for the continuous advance thereof.

These and other objects of the invention will in part be obvious and will in part appear hereinafter.

The invention accordingly comprises the article possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein:

Fig. 5 is a sectional view taken on the line 5—5 of Fig. 3;

Fig. 6 is a sectional view taken on the line 6—6 of Fig. 5;

Fig. 7 is a sectional view taken on the line 7—7 of Fig. 2; and

Figure 1:
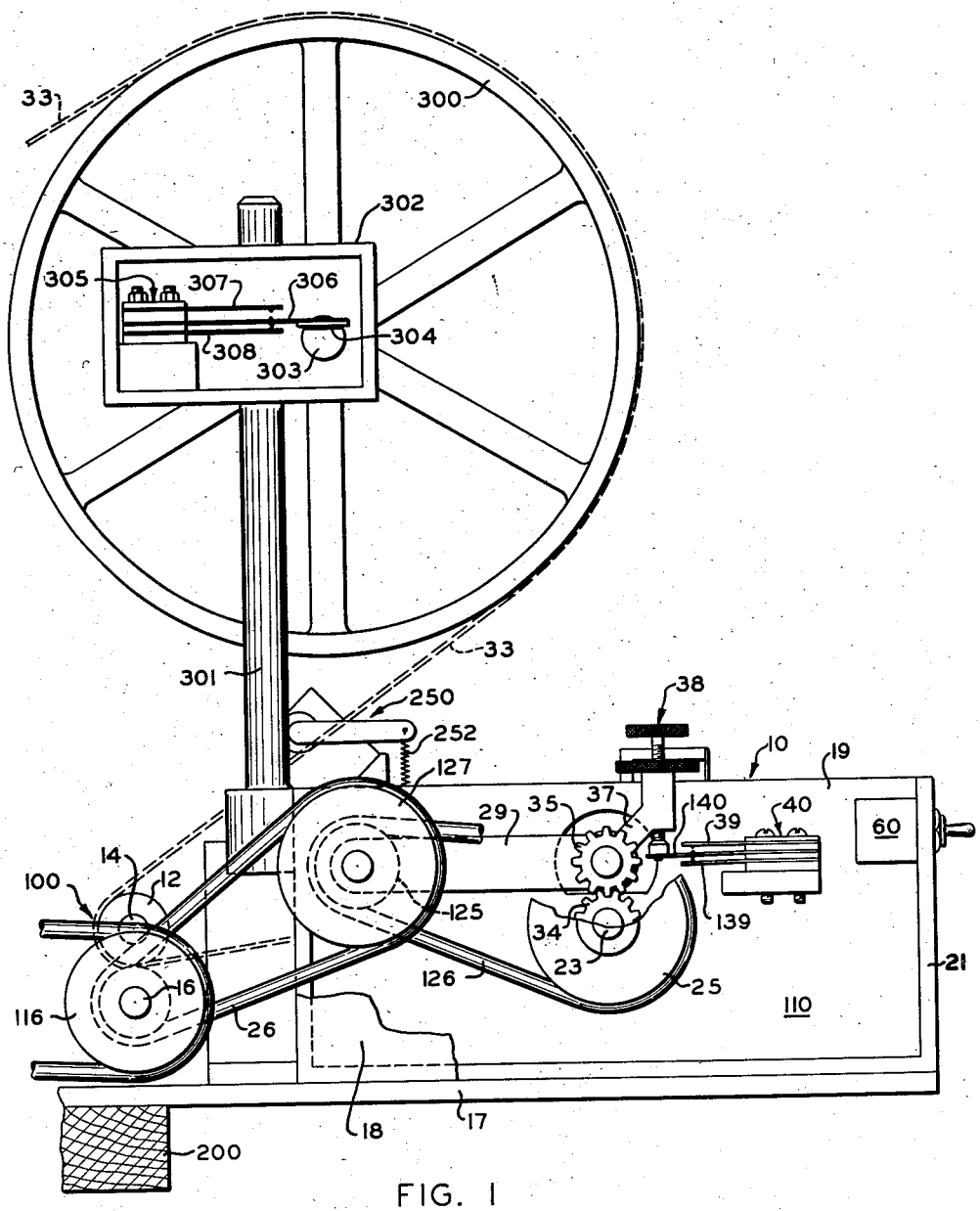
Figure 1 is a side elevation of the cutting apparatus of my invention, with parts thereof broken away and with parts removed, and also shows the apparatus in association with parts of a sewing machine for purposes of illustration.

Certain industrial operations require that continuous material, such as ribbon, webbing and the like, be cut or severed transversely at predetermined locations. In certain instances the continuous material may have thick portions, humps or bumps located lengthwise thereof at spaced and regular or irregular intervals as a result of forming the continuous stock from a multiplicity of short sections of the material joined in end to end relation. In other instances the material may have a substantially uniform thickness, as in the case of a continuously woven or knitted ribbon or web or the like.

It is often desirable to sever continuous material of a kind characterized as possessing thick portions throughout its length into strips which each include one of the thick portions or bumps of the continuous stock. It is also desirable to sever material of this character, as well as continuously woven or knitted material, into strips of equal length. Examples of both practices are found in the garment trade. The apparatus of the present invention is designed to operate upon continuous stock in accordance with either of the just noted practices.

It is also to be noted that the material to be severed is frequently undergoing movement or advancement in a direction lengthwise of itself following the work operation to finish it in its final continuous form. By one feature of the present invention it is intended to carry out the cutting operations for severing the finished material while continuing its movement from the work station at which it was placed in finished form.

As a specific example wherein continuous material is undergoing movement as it is discharged from the work station where it is placed in finished form, reference is made to the manufacture of women's garments, such as slips. In making garments of this nature it is customary to form the straps therefor from scrap materials remaining from the cloth from which the panels of the slip are cut. The strap is trimmed to width and cut into sections of from four to twenty-four inches in length. These sections are sewed together, end to end, to provide continuous material. The width of this continuous material is about three times that of the finished strap. The partially finished continuous strap material is run through a sewing machine which has a folder mechanism and two parallel needles. After undergoing folding and double edge sewing operations, the continuous material is in the form of a ribbon, or web or the like, with overturned edges and of finished width dimension but has thick portions where adjacent sections are overlapped in joining relation. Individual straps are formed by cutting the material in back or in front of each thick portion. The thick portions or humps at the end of each strap are useful for the purpose of retaining a buckle on the strap.

By conventional practice, two pressed-together delivery or pinch rolls, between which the material is engaged, are associated with the double needle sewing machine and by exerting a slight tension on the material assures its removal from the sewing machine preparatory for cutting the continuous material into the desired sections. One of these rolls is driven by the sewing machine, and the two rolls are geared together to rotate at the same speed.

By the present invention, cutting apparatus is provided to operate upon material which is advanced thereto from a work station of some other machine as well as apparatus which is operable independently of any existing machine upon material furnished from a stationary supply such as a stock roll or a supply of continuous stock coiled loosely in a bin or on a floor. When used with an existing machine, the cutting apparatus enables the machine to carry out an additional work operation.

Strap-forming and strap-cutting operations of the character heretofore described serve admirably for the purpose of illustrating my invention and the same will be described in connection therewith.

The present invention provides certain improvements over the cutting apparatus of my previously mentioned copending application. Among these improvements are electrical and mechanical means designed to carry out each cutting cycle with great rapidity and to cause a rotatable knife member to fully and quickly clear itself after a cutting stroke from contact with material undergoing continuous advancement to the cutting means of the apparatus. Other improvements comprise means for causing the material to be cut in accordance with a predetermined length or in accordance with thickness variations thereof, as well as means for permitting the material to be cut at an acute angle or across its transverse axis, and also means providing a simplification and improvement of the drive coupling and shaft mounting for the rotatable knife members of the apparatus.

With reference to the drawings, 10 generally indicates cutting apparatus adapted to be employed in combination with delivery mechanism which is generally indicated by the numeral 100 and which is designed to carry out several functions. One function of the delivery mechanism 100 is to move continuous material which is to be cut, without interruption, in a direction lengthwise of itself and towards the cutting apparatus 10 for engagement by feed means of the cutting apparatus. Another function of the delivery mechanism 100 is to drive the feed means of the cutting apparatus, and it may also be utilized to rotate a measuring wheel 300 of length-measuring or detecting mechanism provided on the cutting apparatus 10 and employed to control the cutting of continuous material to length. Delivery mechanism 100 may, as shown, be mounted upon and may form a part of an existing device as, for example, a sewing machine 200 with which the cutter is associated, or the delivery mechanism may be mounted upon the base plate 17 of apparatus 10.

The feed means of the cutting apparatus are mounted within what may be noted as a feeding section 110 of the apparatus 10 and are located in a position to engage the continuous material advanced by the delivery means and advance the material, without interruption, to cutter means operable to effect the desired severing of the material. The feed means also control a thickness detector utilized when cutting the continuous material in accordance with thickness variations. The cutter means are mounted within the apparatus 10 in what may be treated as a cutting section 210.

Figure 8:
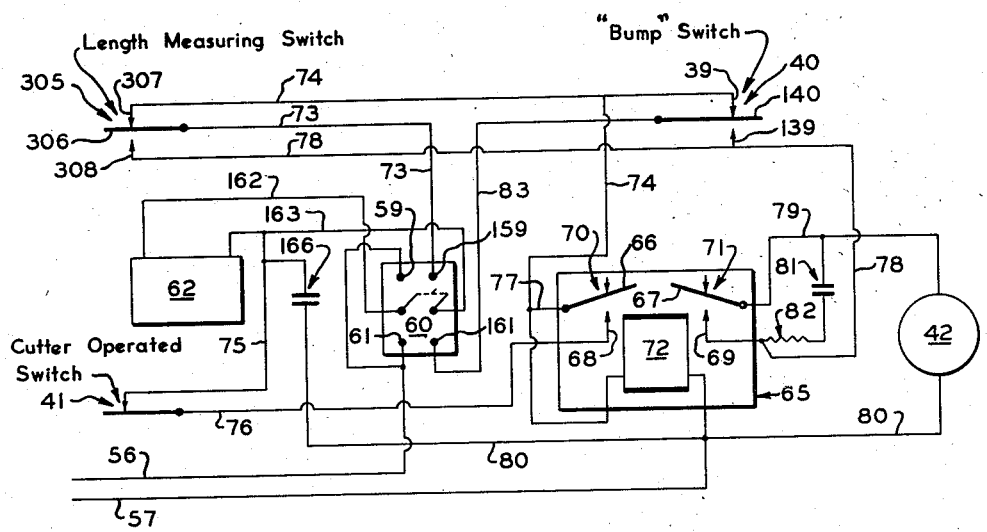
Fig. 8 is a diagrammatic showing of the electric circuit arrangement used in conjunction with the cutting apparatus of my invention.

The essential instrumentalities of the cutting apparatus 10 are, in a broad sense, completed by the provision of a novel electric circuit arrangement, shown in detail in Fig. 8, which, in combination with detector mechanism, controls actuation of a rotary solenoid in cutting section 210 which is adapted to drive a knife member whereby to cut the continuous stock in accordance with desired length or with variation in thickness.

Specifically, for the purpose of illustration, delivery mechanism 100 is represented as comprising a pair of conventional and similar pull rolls 12 and 15 employed with a double needle sewing machine of the character heretofore described. Rolls 12 and 15 are fixed, respectively, to shafts 14 and 16 which are conventionally and rotatably supported upon the table of the sewing machine 200. Shafts 14 and 16 are geared together by gears (not shown) and in a manner similar to the shafts for the feed means to be presently described. The gearing for the shafts 14 and 16 effects rotation of these shafts at similar speeds. The shaft 16 and the roll 15 fixed thereto may be driven from the sewing machine drive means and at a circumferential or peripheral speed considerably reduced from that of the sewing machine drive means. Rolls 12 and 15 rotate, however, at a circumferential speed sufficient to keep the continuous material under a fair amount of tension and slip on the material. As the sewing machine proper forms no part of my invention, details thereof have been omitted and sewing machine elements which are illustrated have been represented somewhat diagrammatically for the purpose of simplification.

A belt pulley 116 is shown fixed to the shaft 16 having the driven roll 15 associated therewith and may be employed for completing the just mentioned driving connection with the sewing machine, or it may be directly connected to an independent power source for driving the cutter apparatus and the delivery mechanism. Alternatively, and as previously mentioned, the various elements of the delivery mechanism 100 may be mounted upon plate 17 of the cutter 10 instead of on the sewing machine 200.

The length-measuring mechanism associated with the cutting apparatus comprises a measuring wheel 300 carried on a vertical post 301 mounted upon the cutting section casting 210. Post 301 is provided with a cast collar 302 adjustable on the post by means of a conventional set screw or other arrangement. Collar 302 is provided with a bearing adapted to rotatably support a shaft 303 to which the measuring wheel 300 is removably fixed by any conventional means. The collar 302, which may comprise a casting, includes a housing for detector-actuator mechanism, which will be described in more detail hereinafter but which serves the function of causing the cutter mechanism to sever a length of material equal to the circumference of the measuring wheel 300 upon passage under the knife member of a section of the continuous material equal in length to the circumference of the wheel. A set of measuring wheels, each having a different circumference, is adapted to be provided with the cutting apparatus 10 so that cutting a strip of desired length from the continuous material may be obtained by use of a measuring wheel 300 having a circumference equal to said desired length.

As shown in the drawing, the cutting apparatus 10 is arranged for cutting strips of predetermined length. For this purpose the continuous material 33 may be led from the presser foot of the sewing machine over the measuring wheel 300 and thence around and between the pull rolls 12 and 15 into the feeding section of the apparatus 10. One purpose of making the measuring wheel adjustable vertically is to obtain as much "wrap" as possibe of the material 33 around the measuring wheel 300. Another reason for making the wheel 300 vertically adjustable is to accommodate wheels of different circumferences. Friction between material 33 and the wheel 300 as the material is advanced by the delivery mechanism 100 is sufficient to rotate the wheel and its shaft 303.

The length measuring mechanism may also be employed in instances wherein the continuous material 33 is in the form of a stationary supply, such as a roll or a coil. In these instances it may be desirable to associate one or more conventional guide means to the left of the pull rolls 12 and 15 shown in Fig. 1.

In instances wherein the cutting apparatus is used with a sewing machine, but the continuous material is to be cut in accordance with its variation in thickness at bump portions, the continuous material may be led directly from the presser foot of the sewing machine through the pull rolls 12 and 15 and thence into the feeding section of the cutting apparatus 10. A similar arrangement would be employed in case the continuous stock is drawn from a stationary supply. At the same time it is possible to guide the continuous material 33 over the measuring wheel 300 even in instances where the cutting apparatus 10 is set up to cut in accordance with variations in thickness of material.

The cutting apparatus 10 is adapted to be aligned with the delivery mechanism 100 and for this purpose one end of the base plate 17 of the cutter is seated upon the table of the sewing machine 200 and secured thereto by any conventional means, such as bolts, brackets or the like. The feeding section 110 of the cutting apparatus 10 comprises an enclosure formed of a back wall 19 and end walls 20 and 21 which extend above the base plate 17 and which are closed at the front edge thereof by a detachable cover member 18. (See Figs. 1, 2 and 3.)

The cutting section also comprises an enclosure which, in this instance, is a casting 210 mounted upon the base plate 17 for adjustable movement both longitudinally of the path of flow of the material undergoing cutting and also at an angle thereto. As may be observed, the casting 210 is formed and mounted on plate 17 so as to provide a passageway which is located adjacent the wall 19 and which is adapted to be aligned with the delivery mechanism 100 so that material 33 delivered thereby may be drawn through the passageway by the feed means and fed to the cutter means within the casting. To assist in guiding the material through this passage to the feed means, use is made of a guide member 22 positioned therein and supported from the wall 19. Feed rolls for the cutting means, as will presently appear, are also located in this passageway.

Feed means for the cutting apparatus comprises a shaft 23 which is rotatably mounted on a suitable bearing block 24, supported upon the base plate 17 in the feeding section. Shaft 23 extends through the rear wall 19 of the feeding section and through the cover 18, when the latter is mounted. The forward end of shaft 23 is provided with a belt pulley 25 which, as shown, is connected by means of a belt 126 to a belt pulley 125 fixed on the end of an idler and pivot shaft 30 which is suitably supported for rotation in a boss 130 fixed to the back wall 19 of the cutting section.

Shaft 30 also has fixed thereto a belt pulley 127 which is connected by means of a belt 26 to a belt pulley 27 fixed on the driven shaft 16 of the delivery mechanism 100.

A feed roll 28 is fixed on the end of shaft 23 which extends through the back wall 19 of the housing for the feed means.

Other parts of the feeding means comprise a floating or rock arm 29 which is pivotally mounted and retained on idler shaft 30 by conventional means. Extending through the end of the floating arm 29, opposite the pivot shaft 30, is a shaft 31 which is rotatably supported by the arm 29 by conventional means and to which there is fixed for rotation therewith an idler roll 32 adapted to cooperate with the driven feed roll 28. The force of gravity, and/or a spring, constantly urges the floating arm 29 and the idler roll 32 into contact with the driven roll 28 of the feed means. An opening in back wall 19 permits the shaft 31 to extend therethrough and allows for the elevation of this shaft in accordance with the thickness of the material passing between the feed rolls. It is to be observed that all shafts, so far described, are substantially parallel to each other and are located substantially at right angles to the direction of flow of material to be cut.

Rolls 28 and 32 together provide the feed means for the continuous material and are adapted to engage the continuous material 33, delivered by the pull rolls 12 and 15, and to continue the advancement of this material towards the cutter means of the apparatus 10. It may be observed that the arm 29 and the idler roll 32 are so mounted that when a thick portion passes between the feed rolls 28 and 32 the arm 29 and the idler roll 32 will be elevated.

Shafts 23 and 31 are geared to each other by means of gears 34 and 35 which are fixed, respectively, to said shafts. Gearing the shafts together in this manner assures a drive for the feed rolls 28 and 32 of such character that when a part of the continuous material, which has a thick portion, reaches the rolls it will be engaged thereby and fed through them and will not wedge and prevent operation of the feed.

The material to be cut is kept under slight or limited tension as it is advanced from the delivery mechanism 100 by the feed rolls 28 and 32 to the cutting means of apparatus 10. Specifically, the pulley ratio illustrated is designed to accomplish this for cutting mechanism 10 associated with the sewing machine 200 wherein the delivery mechanism 100 is driven off of the power source for the sewing machine and at a speed of about 500 R. P. M. which is considerably reduced below the peripheral speed of said power source. As will be well understood by the art, in instances where the peripheral speed of the rolls of the delivery mechanism is of greater or smaller magnitude than that mentioned, appropriate change may be made in the pulley ratio to keep the material under the desired slight tension.

The feed rolls 28 and 32 feed the material 33 to cutter means which is mounted within the cutting section casting 210 and which severs the continuous material into strips. These cutter means comprise a stationary blade or knife member 52 adapted to cooperate with a rotatable knife member 47 fixed to a rotatable shaft 43 coupled to a rotary solenoid 42.

The stationary knife member 52 is suitably fastened, by screws to a block 53 which may be adjustably secured to said casting 210 by threaded fastening means 153 to permit relative adjustment of the knife members 47 and 52 towards and away from each other. Fastening 153 allows movement of block 53 for coarse adjustment of knife 52 while the screws shown in Fig. 2 for securing the knife 52 to said block 53 permit fine adjustment of said knife. The rotatable knife member 47 is fastened or otherwise fixed to a disk 46 secured to one end of shaft 43 by soldering, welding, threading or by other conventional means. Cutter shaft 43 is mounted for rotation within a shaft housing which forms a part of the casting 210 by means of a ball bearing 143 and bushing 243 mounted in said housing.

Means for coupling cutter shaft 43 to solenoid 42 are detailed in Figs. 5 and 6 and comprise a coupling arm 45 fixed on the solenoid drive shaft 44 adapted to be connected to a coupling arm 145 fixed on the end of cutter shaft 43. The connection between arms 45 and 145 is effected by a pin 245 fixed to arm 45 and extending therefrom and into an opening 246 in the coupling arm 145. Opening 246 is of greater diameter than pin 245 so that use is made of screws 247 which extend through the coupling arm 145 and into the opening 246 from diametrically opposed locations to effect a positive connection between pin 245 and arm 145. In this regard, screws 247 permit a few degrees of rotative adjustment of coupling arm 145 and consequently cutter shaft 43 relative to the solenoid shaft 44 whereby to permit the rotatable knife member 47 to be accurately set for the stroke of the solenoid. Features of this coupling arrangement reside in its ease of adjustment and the elimination of precision machining in its manufacture.

As may be observed, cutter shaft 43 is spring loaded by means of a spring 146 mounted thereon and in bearing with bushing 243 and a thrust bearing 147 located on the shaft and in contact with coupling arm 145. Spring 146 constantly urges cutter shaft 43 towards the solenoid and is employed to arrest axial motion of said cutter shaft.

Solenoid 42 is a commercially available rotary solenoid, parts of which are mounted within a conventional housing. The solenoid is of a type having a stroke within a range of from 60° to 100° and has a spring actuated return whereby to return the solenoid shaft to its at rest position upon deenergization of the solenoid. The housing for the solenoid 42 is mounted within the cutting section casting 210 by any conventional means, such as threaded fastenings (not shown), and against a wall portion formed in said casting.

It will be apparent from the foregoing that the continuous material 33 which is fed by the feed rolls 28 and 32 over the stationary blade 52 will be severed by the rotatable blade member 47 upon actuation of the solenoid 42. Following deenergization of the solenoid, spring return 142 rotates the knife member 47 to its at rest position preparatory to a repetition of the cutting cycle.

Deenergization of the solenoid 42 is effected by means of a cutter operated switch 41 mounted within casting 210 and employed in a manner to be more fully set forth. Switch 41, as shown in Figs. 5 and 7, comprises two resilient switch blades 48 and 49 normally in contact with each other. Blade 49 is provided with a portion which extends beyond its contact point with blade 48 and below a cutaway portion in the rotatable disk 46 whereby the disk is provided with a striking surface 50 which strikes an insulated button 51 on blade 49 as the disk is rotated to the full extent of the solenoid stroke whereby the switch 41 is opened. This deenergizes solenoid 42 which returns to its at rest position while switch 41 closes due to the resilient nature of its blades 48 and 49.

To count the number of cuts a counter 250 is shown mounted on the main housing for the cutter shaft drive mechanism. The actuator arm 251 of said counter is connected by a spring 252 to coupling member 145, as through an arm secured to said member or to an adjusting screw 247, so that when coupling member 145 is rotated for a cutting stroke the counter 250 is operated. On return of the coupling member from the cutting stroke, actuator arm 251 also returns to its normal position.

One feature of the invention resides in mounting the cutter casting 210 for adjustable movement parallel to the flow path of the material undergoing cutting, and also for adjustment at an angle to said path. These adjustments are permitted by reason of the fact that the rotatable knife member 47 and its drive means, as well as the stationary knife 52, are all supported by the casting 210 and consequently are movable with the casting.

A flange portion 156 is formed on the side of the casting adapted to be located closest to the back wall 19 of the feeding section 110. When the continuous material 33 is to be cut transversely of itself, the cutter shaft 43 and solenoid shaft 44 must be lined up in parallel relation to the flow path of the material undergoing cutting and at a right angle to the axes of the feed rolls 28 and 32. To facilitate this positioning of the cutter casting 210, the edge of flange 156 is made substantially parallel to the longitudinal axis of the cutter shaft 43 and solenoid shaft 44 whereby registration of the cutter casting is simply effected by moving it until this edge of flange 156 is an overall contact with the back wall of the feeding section 110, the surface of back wall 19 lying substantially in a vertical plane at right angles to the axes of feed rolls 28 and 32. In addition, it may be noted that the upper surface of flange 156 forms the bottom of the passageway between the feeding section 110 and the cutter casting 210 and through which the strip material is passed to the feed rolls 28 and 32.

Figure 3:
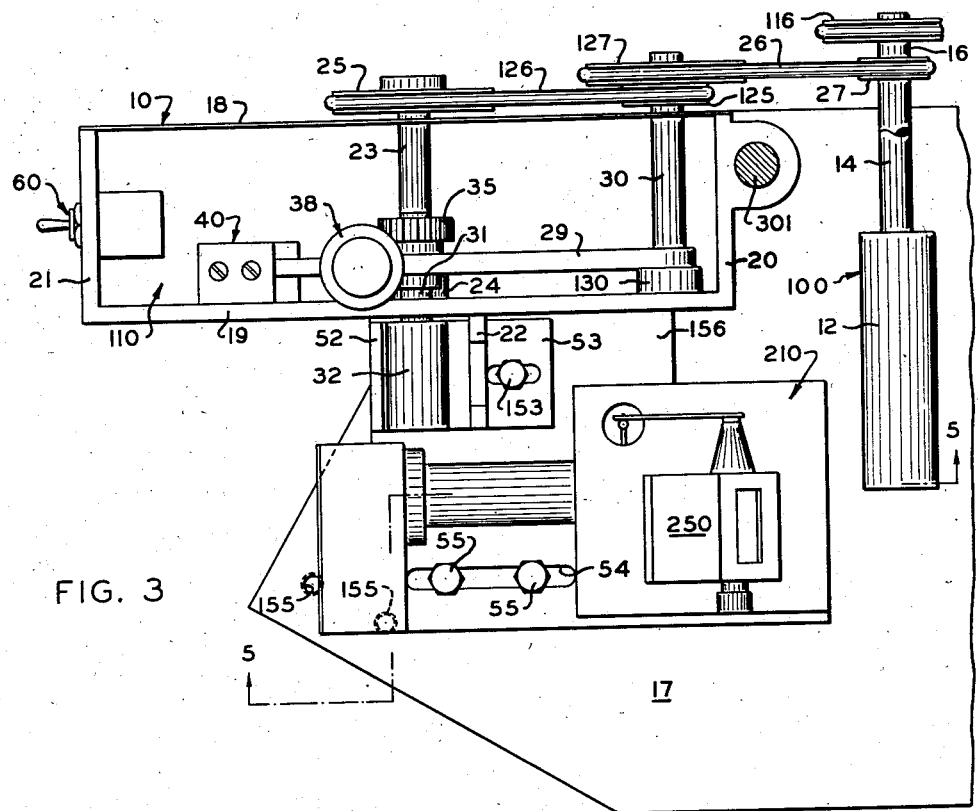
Fig. 3 is a plan view of the apparatus of Fig. 1.

The cutter casting 210 is provided with a longitudinally extending slot 54 to permit the casting to be adjustably secured to the plate 17 by means of socket screws 55 which extend through the slot 54 into tapped holes in the plate 17 and are adapted to engage the casting and hold it in adjusted position. Longitudinal adjustment is limited by the length of slot 54, the axis of which is shown in Fig. 3 in parallel relation to the flow path of material 33. This adjustment permits the cutter head to be moved towards and away from the feed rolls 28 and 32 and is employed to locate the position of the cut when cutting the material 33 along its transverse axis.

Figure 4:
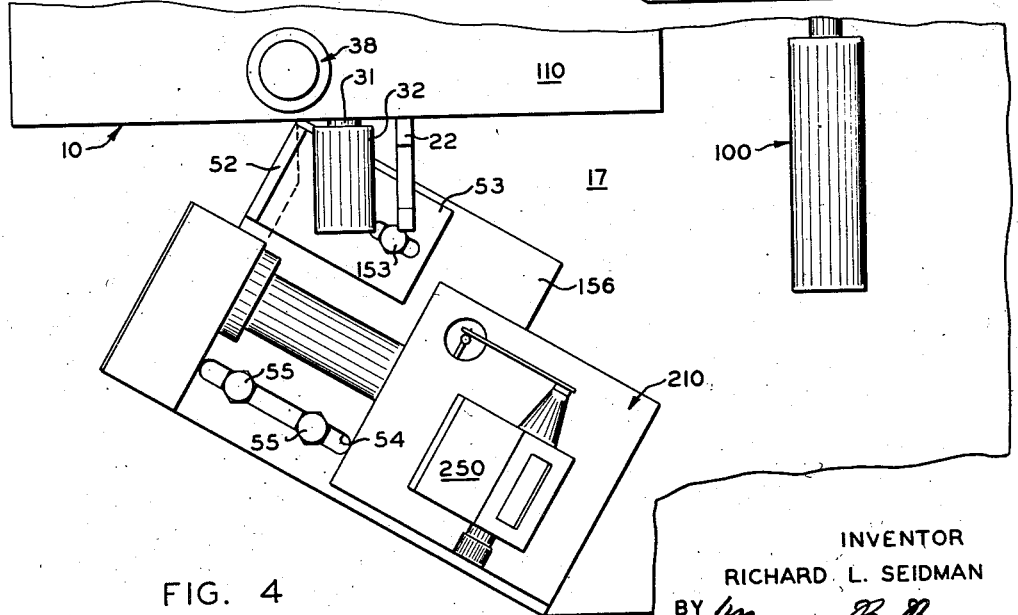
Fig. 4 is a partial plan view similar to Fig. 3 showing the cutter section of the device in angular adjustment with respect to the feeding section thereof.

Angular adjustment of the casting 210 to cut the continuous material at an angle of other than 90° to its longitudinal axis is permitted by providing one or more sets of tapped holes 155 appropriately located in the plate 17 to permit the casting to be adjusted about a pivot point close to the foreward corner of the casting closest to the feed rolls 28 and 32 and into the position illustrated in Fig. 4. Screws 55 engaged with holes 155 are employed to hold the casting in the angular position shown which is for a 30° cut. Additional sets of tapped holes 155 may be employed to permit different angular adjustment of the casting. Furthermore, if desired, means permitting angular adjustment at any angle up to 30° or greater may be provided.

Operation of the solenoid 42, to carry out the desired cutting operation, is effected by either one of two detector-actuator mechanisms controlled, respectively, by the feed means of cutting apparatus 10 and by the measuring wheel 300.

The detector-actuator mechanism, which controls cutting in accordance with the thickness of the material, makes use of adjustable contact screw 38 carried by a finger 37 fixed to the free end of the arm 29. Contact screw 38 is adapted to actuate switch mechanism for effecting the operation of the solenoid 42 and for this purpose is in electrically insulated contact with a blade element of said switch mechanism.

The switch operated by contact 38 is generally referred to as the "bump" switch means or by similar terminology. This switch is indicated by the reference numeral 40 and comprises a resilient switch blade 140 adapted to be moved into contact with either of two switch blades 39 and 139 which are also resilient but which are held in relatively fixed relation. Switch 40 is suitably mounted on back wall 19 of the feeding section or at any other convenient location.

In the embodiment of the invention illustrated, contact screw 38 is normally in electrically insulated contact with the resilient switch blade 140 and maintains this blade in closed contact with the switch blade 139 until a thick portion of the continuous material is passed between the feed rolls 28 and 32 to raise arm 29. When the arm 29 is elevated the resiliency of switch blade 140 causes it to break contact with the blade 139 and to move into contact with switch blade 39.

The detector-actuator mechanism used in cutting to length employs a switch 305 carried within casting 302 and similar to switch means 40. The switch 305 is generally referred to as the length measurer switch and comprises a movable switch blade 306 and two relatively fixed but resilient switch blades 307 and 308. An extension on blade 306 is adapted to make insulated contact with a flat 304 formed on the periphery of shaft 303 of measuring wheel 300. When flat 304 is horizontal, with the round of shaft 303 extending below the flat, switch blades 306 and 308 are in contact as shown in Fig. 1.

Figure 2:
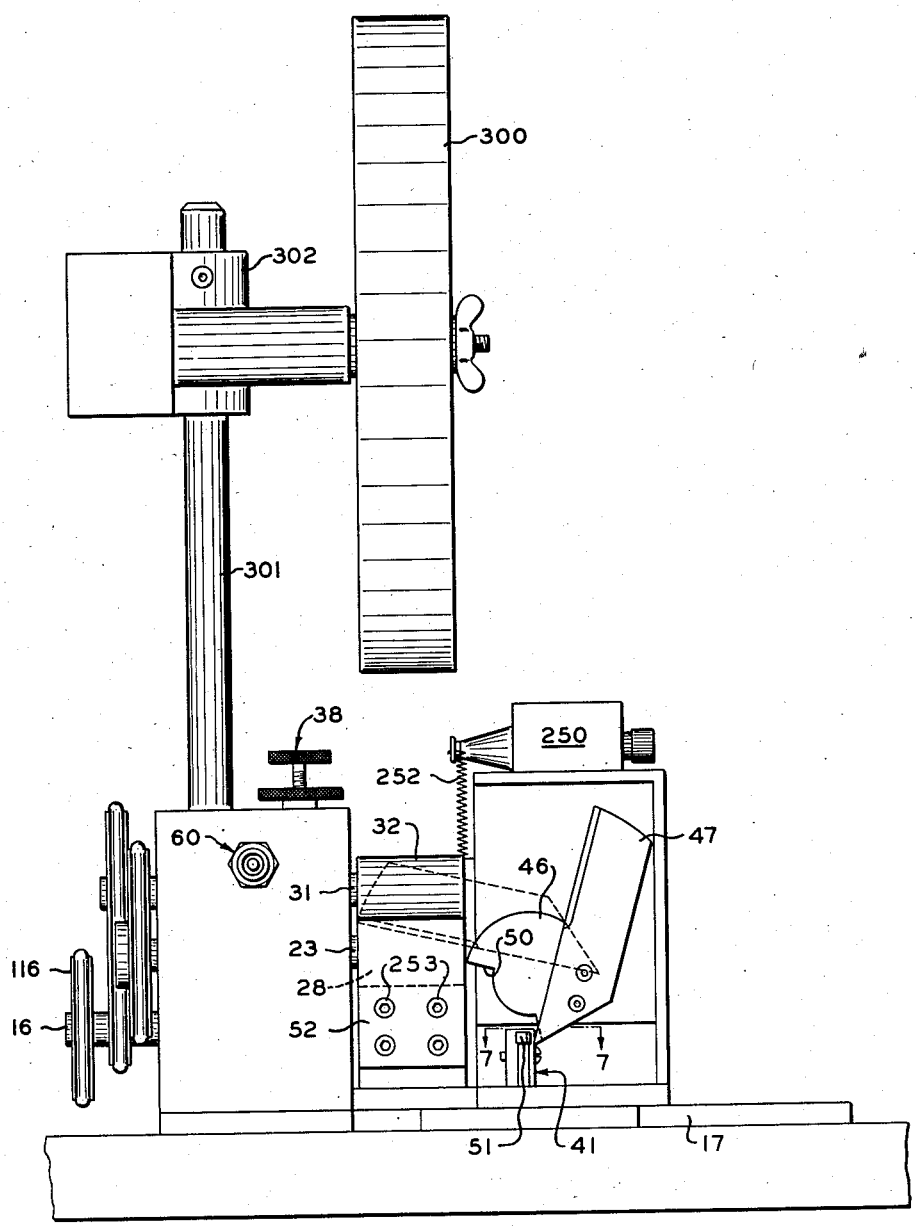
Fig. 2 is an end elevation taken from the right of Fig. 1.

As shaft 303 is rotated from the position in Fig. 1, the round on the shaft engages blade 306 and moves said blade into contact with blade 307. Blade 306 remains in contact with the round of the shaft 303 until said shaft has rotated by substantially a complete revolution from its starting position shown in Fig. 1, whereupon blade 306 slips off the round of the shaft and makes contact with blade 308. In switch 305, blades 306 and 308 are designed to be closed when not separated by the round of shaft 303 while blades 140 and 39 of switch 40 are designed to be closed when not separated by contact screw 38.

It has been previously intimated that solenoid 42 is a commercially available rotary solenoid having a spring actuated return and at least a 60° stroke. As such, solenoid 42 is provided with the usual plate assembly 242 located outside of the solenoid casing at one end thereof. Assembly 242 comprises a conventional drive plate fixed to the solenoid shaft 44 in spaced relation to the outside of the solenoid casing but holding ball bearings, which are positioned in special slots (not shown) in said plate, in contact with the outer surface of the solenoid casing. Conventionally, solenoid shaft 44 is fixed to the solenoid armature and the plate assembly 242 translates axial movement of the solenoid armature upon energization thereof into rotary movement of said shaft 44.

Return of the solenoid upon deenergization to its starting position may be effected as shown by use of a spring fixed to the plate of said assembly 242 and some stationary part of the solenoid support or other stationary member. Alternatively, spring 142 may be located at the end of the solenoid opposite that shown and may be connected to some movable part of the solenoid, for example, shaft 44, and to some stationary member.

Rotary solenoids of the type which have a return spring and which are generally suitable for use with my invention are illustrated in United States Letters Patent No. 2,496,880, issued February 7, 1950, to G. H. Leland. More specifically, a "Ledex" rotary solenoid, current model number 6, manufactured by G. H. Leland, Inc., of Dayton, Ohio, and having a 90° stroke is satisfactory in carrying out my invention.

The cutting apparatus is intended to carry out cutting operations at high speeds. For example, when the delivery mechanism 100 is driven by an independent power source, cutting of two inch strips at the rate of six cuts per second has been successfully conducted. Even where the cutting speed limited to the output of another machine, rapid cutting is being carried out. For example, the output of a sewing machine which turns out thirteen feet per minute of finished continuous material is easily handled for cutting into two inch strips. For most general applications, the delivery rolls of the mechanism 100 will be driven at about 500 R. P. M. with the feed rolls 28 and 32 rotated at a circumferential speed which is slightly over the linear delivery speed of the continuous material.

Under these circumstances it will be recognized that each cutting cycle of the solenoid must be carried out with great rapidity and in timed sequence to the movement of the continuous material. This requires instantaneous energization and deenergization of the solenoid as well as the maintenance of its energization for a time sufficient to permit its stroke to be completed, and further requires a quick return of the solenoid to its at rest position after completion of its stroke. These essentials and requirements are attained by the use of the heretofore described length and thickness detector-actuator mechanisms and the cutter operated switch 41 in the circuit arrangement detailed in Fig. 8.

The circuit arrangement in Fig. 8 uses a double pole, double throw master switch 60 having two sets of contact poles 59, 159 and 61, 161 for connecting a 110 volt alternating current source to a rectifier 62 and the output of said rectifier to either the blade 306 of the length measuring switch 305 or the blade 140 of the "bump" switch 40. Alternating current from the source is connected through lead 56 to switch contacts 59 and 61 both of which are connectable through one blade of switch 60 and lead 162 to the alternating current side of rectifier 62. Direct current output of the rectifier 62 is conducted by lead 163 to the second blade of the master switch 60 for connection to switch contact 159 if the switch blades are positioned to close contacts 59 and 159 or to the switch contact 161 if the switch blades are positioned to close contacts 61 and 161 thereof. The center position of switch 60 is its "off" position.

Rectifier 62 is a conventional 150 milliampere, 115 volt selenium rectifier. A polarized condenser 166 having a capacity of from 80 to 100 microfarads at 150 volts is placed in the circuit arrangement to reduce or smooth out the ripple in the direct current supplied by the rectifier 62 to the solenoid and is connected therebetween through the lead 80. Similar electrical elements and devices corresponding to any desired voltage may be employed in place of those specifically mentioned herein.

Energization of solenoid 42 is controlled through a relay 65 in conjunction with one of the switch means 305 or 40, depending upon the setting of the master switch 60. Relay 65 is of the type having two armatures 66 and 67 which are spring loaded to normally maintain them out of bearing with contact points 68 and 69 but which are brought into bearing therewith upon energization of the relay coil 72. In effect, the armature-contact pairs 66 and 68 and 67 and 69 provide single pole, single throw switches 70 and 71 operable by the relay.

A relay circuit, a relay-holding circuit and a solenoid circuit are associated with each set of contacts 59, 159 and 61, 161 of master switch 60. Assuming switch 60 is thrown across the contacts 59 and 159, the relay circuit includes lead 73 connecting pole 159 to movable blade 306 of length measuring switch 305, lead 74 from blade 307 of switch 305 to the relay coil 72 and a lead 57 from the coil 72 back to the source. The relay-holding circuit includes a lead 75 from the direct current side of the rectifier 62 to one side of the cutter operated switch 41, a lead 76 from the other side of switch 41 to contact point 68 of the relay switch 70, the armature 66 of the relay and a lead 77 to the lead 74. The solenoid circuit includes lead 73, switch blades 306 and 308 of the length measuring switch 305, lead 78 from blade 308 of switch 305 to contact point 69 of relay switch 71, the armature 67 of the relay, lead 79 to the solenoid and lead 80 to lead 57 to the source.

A condenser 81 having a capacity of .1 microfarad at 600 volts is connected in series with a 5 watts, 10 ohm resistor 82 between leads 78 and 79, as shown, for the purpose of spark suppression across the relay contacts in the solenoid circuit.

It is to be observed that lead 74 is common to switch blades 307 and 39 of the length measurer switch 305 and the bump switch 40, respectively, while lead 78 is common to the switch blades 308 and 139 thereof. It may also be observed that contact 161 of the master switch 60 is connected by a lead 83 to the movable switch blade 140 of the bump switch 40. Under these circumstances it will be apparent that operation of the master switch 60 to connect contacts 61 and 161 thereof with the line and with the bump cutter 40 provides a set of minor circuits in the circuit arrangement of Fig. 8 similar to that described in connection with the length measurer switch 305 and comprising, in addition to the rectifier circuit, a relay circuit, a relay-holding circuit and a solenoid circuit.

Operation of the circuit arrangement of Fig. 8, and the electrical and mechanical means for effecting strip cutting, may be understood with reference to Figs. 1 and 8 and with the master switch 60 assumed as thrown to a position for closing its contact poles 59 and 159 whereby the continuous material is cut to length.

Under these conditions and with reference to Fig. 1, it is assumed that a strip approximately equal in length to the circumference of the measuring wheel 300 has just been cut and that the solenoid and the movable knife member 47 have been returned to their at rest positions preparatory to making the next successive cut. Rotation of shaft 303 from its position shown in Fig. 1 causes the round of said shaft to lift blade 306 out of contact with blade 308 and bring it into contact with blade 307.

The result of contact between switch blades 306 and 307 of the length measurer 305 is illustrated in Fig. 8. Rectified or direct current is directed through lead 73 from contact 159 of switch 60 to blade 306 and from there through blade 307 and lead 74 to the coil 72 of the relay 65. The result is to energize the relay coil 72 and to bring the relay armatures 66 and 67 into bearing with their respective contacts 68 and 69. For the purpose of illustration, in Fig. 8, it is assumed that blades 306 and 307 have just been moved into contact but that the switches 70 and 71 provided by the relay armatures 66 and 67 have not as yet closed. Actually, closing of the switches 70 and 71 is substantially instantaneous with closing of the switch blades 306 and 307.

The relay-holding circuit is set up upon closure of the relay operated switches 70 and 71. By this circuit, direct current is led through the lead 75, cutter operated switch 41, lead 76 to the contact 68 of switch 70, through the armature 66 and lead 77 to lead 74 and the relay coil 72. As a result, the relay coil is maintained in a continuously energized condition until the cutter switch 41 is opened regardless of the movement of the switch blade 306 with respect to the switch blades 307 and 308. Thus, the entire circuit arrangement is set up for triggering the solenoid through the solenoid circuit.

It is to be kept in mind that the material 33 is undergoing continuous advancement and that the relay circuit and the relay-holding circuit are both maintained while the shaft 303 continues to rotate following contact of switch blades 306 and 307 and until blade 306 slips off of the round of the shaft and into contact with blade 308. This latter condition results in triggering the solenoid by closing the solenoid circuit through lead 78, contact 69 and armature 67 of the relay operated switch 71, and the lead 79 from switch 71 to the solenoid. As a result, solenoid 42 is actuated to effect a cut of the material upon each complete revolution of the measuring wheel 300.

Upon completion of its stroke, the striker surface 50 on the flange 46 at the end of cutter shaft 43 opens the switch 41, thus opening the relay circuit and permitting the spring-loaded armatures 66 and 67 of the relay to return to their normally open positions shown in Fig. 8. As a consequence, the solenoid circuit is broken and the solenoid is deenergized to be instantly returned to its at rest position through the spring 142 connected to the solenoid drive shaft. Also, switch 41 is closed as the solenoid returns the knife member to its at rest position. This completes a cutting cycle and leaves the various elements of the apparatus in position ready to carry out the next cutting cycle in a manner like that described.

Operation of the cutting apparatus, when the circuit arrangement of Fig. 8 is employed with thickness, i. e., bump cutting, is similar to that described in connection with cutting to length and needs no detailed discussion. It may be noted, however, that in the case of bump cutting, the forward or leading edge of a thick portion of the material is used to set up the relay and relay-holding circuits upon raising of the floating arm 29 whereby to permit switch blade 140 to contact blade 39 of the bump switch 40. As the thick portion continues between the feed rolls 28 and 32, the relay circuit is opened but the relay coil remains energized due to the fact that the holding circuit remains closed and when the trailing edge of the thick portion is discharged from the feed rolls the solenoid circuit is triggered to effect cutting of the continuous material adjacent the leading edge of the thick portion that has just passed between the feed rolls. Discharge of the thick portion by the feed rolls restores the floating arm 29 to its position shown in Fig. 1 and closes the switch blades 140 and 139. The cutter operated switch breaks the solenoid circuit and the solenoid and the knife member 47 are returned to the at rest position ready to start another cutting cycle.

Various elements of the circuit arrangement, such as the rectifier 62, the condensers 166, 81, and the relay 65, as well as other parts thereof, may all be mounted within the feed section 110 of the cutting section or they may be supported outside of the feed section 110 and on the plate 17 at any convenient location. To permit clarification in the drawings, all of these electrical elements have been shown together only in Fig. 8 and have, for the most part, been omitted from the other views.

An important feature of the invention is the rotation of the knife member 47 through a large arc. Assuming that the knife member 47 is in a down position after a cutting operation, and has not started its return, it must be recalled that feed rolls 28 and 32 are continuously advancing the material 33 to the cutter means. Unless the knife member is located well away from the flow path of the material when in starting position, a pile-up of the material 33 in back of the knife member will occur with consequent jamming of the cutting apparatus. The circuit arrangement of Fig. 8 assures instantaneous return of the knife member 47 to its starting position at the end of the solenoid stroke. Rotation of the knife member 47 through a large arc assures the desired clearance for the knife member of the moving material, especially when the bottom or the cutting edge of the knife member is restricted at the end of its down strike to a location at about one-sixteenth to one-eighth of an inch below the top surface of the stationary knife member 52. In addition, these factors all combine to render the rotatable knife blade self clearing.

In any event, it may be stated that at the speed mentioned pile-up is substantially eliminated. Depending upon the linear speed at which the material 33 is advancing towards the knife member 47 during the very limited period that the knife member is down, the material will buckle slightly between the knife and the feed rolls or will jump over the knife member. In the first instance the knife member is returned fast enough and far enough so that the buckled material is limited to an amount which will be straightened out by the natural spring in the material when it has been cleared by the knife member 47. In the case where material 33 has jumped over the knife member 47 when it is down, there is sufficient rotation of the knife member on its return to flick off the material which then falls into its normal flow path.

In the circuit arrangement of Fig. 8 it is to be observed that solenoid 42, relay 65, and all operating switches are located on the direct current side of the rectifier. It is possible to locate the operating switches, i. e., the length measuring switch 305, the "bump" switch 40, relay 65 and cutter operated switch 41 on the alternating current side of the circuit. The first noted practice, where the various operating switches are on the direct current side, is preferred since it permits the solenoid action for a cutting cycle to be considerably speeded up and hence permits cutting operations to be satisfactorily carried out at the higher speeds which have been previously mentioned. I have found, however, that cutting operations are successfully handled at the lower speed limits heretofore set forth with a circuit arrangement having the so-called operating switches on the direct current side thereof.

While the cutting apparatus has been illustrated in connection with continuous material in the form of ribbon or webbing formed of cloth or the like, it will be appreciated that any relatively flexible and thin material may be operated upon. For example, material to be cut in addition to cloth includes organic plastic films or the like, metal foil or metallic ribbon, paper and similar substances. Furthermore, the material may be of the character of cord, twine, rope or other form as well as in the form of ribbon or webbing.

As it has been stressed, the cutting operations may be carried out to cut continuous material into strips of predetermined length or at the overlap of adjacent sections of material joined in end to end relation. In the first case, the material is cut for length and in the second case for thickness. In both cases the cutting of the material is controlled by or is in accordance with one dimension of the material and this or similar terminology is employed to express this concept in a generic sense.

Since certain changes may be made in the above article without departing from the scope of the invention herein involved, it is intended that all matter contained in the above description or shown in the accompanying drawings shall be interpreted as illustrative and not in a limiting sense.

What I claim is:

1. Apparatus for cutting continuous material such as ribbon, webbing and the like into strips which comprise successive longitudinally extending portions of said material each having one substantially similar dimension, said apparatus comprising rotatable feed means for engaging the material and advancing it lengthwise of itself; cutter means, including a movable knife member for severing the advancing material into strips and a solenoid for operating said knife member to sever said material; a source of electricity for actuating said solenoid; a relay having a coil and a pair of contacts, each relay contact being adapted to be individually included in an electric circuit upon the energization of said relay; switch means comprising a first contact and a second contact adapted to be individually and alternately connected to said source of electricity; a relay circuit comprising the first contact of said switch means and the coil of said relay; a relay-holding circuit comprising one contact of said relay, said coil and said source of electricity whereby said relay is held in energized condition upon connection of said relay circuit with said source of electricity; a solenoid circuit comprising said solenoid, said second contact of said switch means and the other contact of said relay; said relay-holding circuit including means operable from said solenoid at the end of the stroke of the solenoid for opening said relay-holding circuit to deenergize said relay and said solenoid; switch blade means connected with said source of electricity and movable into individual bearing with said first contact of said switch means and also into individual bearing with said second contact of said switch means; and mechanical means adapted to contact said continuous material as it is advanced for gauging each said portion of the material, which is to be cut into a strip, for said dimension and for effecting the movement of said switch blade means in accordance with the gauged dimension of each said portion into operative bearing with said first contact of said switch means and then out of bearing therewith and into operative bearing with said second contact of said switch means for carrying out the cutting of the advancing continuous material into said strips.

2. Apparatus for cutting continuous material such as ribbon, webbing and the like into strips which comprise successive longitudinally extending portions of said material each having one substantially similar dimension, said apparatus comprising rotatable feed means for engaging the material and advancing it lengthwise of itself; cutter means, including a rotatable knife member for severing the advancing material into said strips and a rotary solenoid for operating said knife member to sever said material; a source of electricity; a relay, said relay having a coil, a first normally open contact and a second normally open contact; a relay-operating circuit comprising said relay coil; a relay-holding circuit comprising said relay coil, said first relay contact and said source of electricity; a solenoid-operating circuit comprising said solenoid and said second relay contact; switch means for connecting said source of electricity first with said relay-operating circuit and then opening said relay-operating circuit and connecting said source of electricity with said solenoid-operating circuit; mechanical means adapted to contact said continuous material as it is advanced for gauging each said successive portion thereof for said dimension and for actuating said switch means to connect said source of electricity first with said relay-operating circuit and then with said solenoid-operating circuit for carrying out the cutting of the advancing continuous material into said strips in accordance with the gauged dimension of each said portion; and a switch in said relay-holding circuit and operable at the end of the solenoid stroke, by means driven by said solenoid, to open said relay-holding circuit and deenergize said relay and said solenoid.

3. Apparatus as defined in claim 2 for cutting continuous material such as ribbon, webbing and the like into strips, wherein said mechanical means gauges said advancing continuous material for length and actuates said switch means for carrying out the cutting of said material into strips in accordance with the gauged advance of a predetermined length of said continuous material.

4. Apparatus as defined in claim 2 for cutting continuous material such as ribbon, webbing and the like into strips, wherein said mechanical means gauges said advancing material for thickness and actuates said switch means for carrying out the cutting of said material into strips in accordance with the increase in thickness of said material over a predetermined minimum thickness.

5. Apparatus as defined in claim 2 for cutting continuous material such as ribbon, webbing and the like into strips, wherein spring means are associated with said solenoid for returning said solenoid and the rotatable knife member operable by said solenoid to their respective at rest positions upon deenergization of the solenoid following a complete working stroke thereof.

6. Apparatus as defined in claim 2 for cutting continuous material such as ribbon, webbing and the like into strips, wherein said solenoid is provided with spring means for returning the solenoid to its at rest position upon deenergization thereof, and wherein said switch in said relay-holding circuit comprises a pair of resilient blade members normally in contact except when the solenoid is at the end of its working stroke.

7. Apparatus as defined in claim 2 for cutting continuous material such as ribbon, webbing and the like into strips, wherein said apparatus includes an alternating current source of electricity and a rectifier connected to said source for converting said alternating current to direct current, and wherein said solenoid, said switch means, said relay and said switch in said relay-holding circuit are all located on the direct current side of said rectifier.

8. Apparatus as defined in claim 2 for cutting continuous material such as ribbon, webbing and the like into strips, wherein said solenoid has a stroke of at least sixty arcuate degrees.

9. Apparatus as defined in claim 2 for cutting continuous material such as ribbon, webbing and the like into strips wherein there is provided a freely rotatable wheel rotatably mounted and positioned in the flow path of said material at a location which precedes the location of said feed means in said path, said material being partially wrapped around said wheel and said material effecting the rotation of said wheel as it is advanced by said feed means to said cutter means, said wheel having a predetermined circumference substantially equal in magnitude to the length desired for each strip into which said material is to be cut and said wheel providing means for gauging the length of each strip into which said material is cut, and movable means forming a part of said switch means and actuated by said wheel upon each revolution thereof for effecting the operation of said switch means to connect said source of electricity with said relay-operating circuit near the beginning of each revolution of said wheel and then with said solenoid-operating circuit near the end of each revolution of said wheel.

10. Apparatus as defined in claim 2 for cutting continuous material such as ribbon, webbing and the like into strips, wherein there is provided a pair of rotatable pull rolls which together form said feed means for advancing said continuous material to said cutter means, said pull rolls being mounted to have their centers located one above the other, means providing a floating mount for floatably mounting one of said pull rolls for movement towards and away from the other pull roll, said rolls being constantly urged into contact with each other and when engaged with said material being separated by the thickness of the part of the material engaged thereby whereby said rolls provide means for gauging the thickness of said material, a movable blade member connected to said source of electricity and forming a part of said switch means, and means operable by the floating mount for controlling the movement of said blade member in accordance with the thickness of said continuous material whereby said blade member is brought into position to close said relay-operating circuit when a thick part of said continuous material is between said pull rolls and to open said relay-operating circuit and close said solenoid-operating circuit when a thin part of said continuous material is between said pull rolls.

11. Apparatus as defined in claim 2 for cutting continuous material such as ribbon, webbing and the like into strips and including delivery mechanism having a pair of pull rolls rotated at a predetermined peripheral speed and between which continuous material from a source of supply is engaged and advanced to the feed means of said apparatus, said feed means comprising a pair of rotatably mounted feed rolls adapted to engage the continuous material discharged from said delivery mechanism and to continue its advance toward said cutter means, drive means connecting said delivery mechanism to said feed means for rotating the pull rolls of said feed means, and means for actuating said switch means to effect cutting operations for severing the continuous material into strips of predetermined and equal length and comprising a freely rotatable wheel rotatably mounted and positioned in the flow path of said material at a location which precedes the location of said feed means in said path, said material being partially wrapped around said wheel and said material effecting the rotation of said wheel as it is advanced by said feed means to said cutter means, said wheel having a predetermined circumference substantially equal in magnitude to the length desired for each strip into which said material is to be cut and said wheel providing means for gauging the length of each strip into which said material is cut, and movable means forming a part of said switch means and actuated by said wheel upon each revolution thereof for effecting the operation of said switch means to connect said source of electricity with said relay-operating circuit near the beginning of each revolution of said wheel and then with said solenoid-operating circuit near the end of each revolution of said wheel.

References Cited in the file of this patent

UNITED STATES PATENTS

| Number | Name | Date |
|---|---|---|
| 317,612 | Barton | May 12, 1885 |
| 1,017,279 | Benjaminowitsch | Feb. 13, 1912 |
| 1,128,518 | Rohland | Feb. 16, 1915 |
| 1,788,741 | Reedy | Jan. 13, 1931 |
| 1,852,232 | Buchhold | Apr. 5, 1932 |
| 1,958,138 | Fowler | May 8, 1934 |
| 2,155,578 | Anderson | Apr. 25, 1939 |
| 2,197,043 | Guyler | Apr. 16, 1940 |
| 2,313,986 | Brown | Mar. 16, 1943 |
| 2,319,103 | Allen | May 11, 1943 |